United States Patent
Zaliznyak et al.

(10) Patent No.: US 8,571,059 B1
(45) Date of Patent: Oct. 29, 2013

(54) APPARATUS AND METHODS FOR SERIAL INTERFACES WITH SHARED DATAPATHS

(75) Inventors: Arch Zaliznyak, San Jose, CA (US); Ramanand Venkata, San Francisco, CA (US); Surinder Singh, San Jose, CA (US); Henry Y. Lui, Millbrae, CA (US); Tim Tri Hoang, San Jose, CA (US); Sergey Shumarayev, Los Altos Hills, CA (US); Thungoc M. Tran, San Jose, CA (US)

(73) Assignee: Altera Corporation, San Jose, CA (US)

( * ) Notice: Subject to any disclaimer, the term of this patent is extended or adjusted under 35 U.S.C. 154(b) by 181 days.

(21) Appl. No.: 13/194,536

(22) Filed: Jul. 29, 2011

(51) Int. Cl.
*H04J 3/00* (2006.01)

(52) U.S. Cl.
USPC ........................................................ 370/464

(58) Field of Classification Search
USPC ................. 370/464, 465, 532–538, 542–545; 341/141; 326/37, 62
See application file for complete search history.

(56) References Cited

U.S. PATENT DOCUMENTS

| | | | |
|---|---|---|---|
| 6,222,380 B1 | 4/2001 | Gerowitz et al. | |
| 7,602,212 B1 * | 10/2009 | Chan et al. | 326/37 |
| 7,698,482 B2 | 4/2010 | Venkata et al. | |
| 7,848,318 B2 | 12/2010 | Nguyen et al. | |
| 7,924,187 B2 | 4/2011 | Diab | |
| 8,401,043 B1 * | 3/2013 | Kadosh et al. | 370/536 |
| 2010/0215086 A1 * | 8/2010 | Vijayaraghavan et al. | 375/219 |

OTHER PUBLICATIONS

Li et al, Bit Matrix Implementation for 40GE and 100GE Block Muxing, Huawei Technologies Co., Ltd., 23 pages, 2008.*
Ghiasi, Architectural Implications of Retimed Limiting, and Linear Interface for nx10G, IEEE 802.3ba, 15 pages, 2008.*

* cited by examiner

*Primary Examiner* — Frank Duong
(74) *Attorney, Agent, or Firm* — Okamoto & Benedicto LLP (57) ABSTRACT

Disclosed are apparatus and methods for providing a serial interface with shared datapaths. The apparatus and methods share or re-use components from multiple lower-speed datapaths so as to efficiently provide a higher-speed datapath. In one embodiment, physical coding sublayer circuitry of the lower-speed datapaths is also used by the higher-speed datapath. In another embodiment, physical media access circuitry of the lower-speed data paths is also used by the higher-speed datapath. Other embodiments, aspects and features are also disclosed.

18 Claims, 7 Drawing Sheets

APPARATUS AND METHODS FOR SERIAL INTERFACES WITH SHARED DATAPATHS

BACKGROUND

1. Technical Field

The present disclosure relates to serial interfaces between electronic devices.

2. Description of the Background Art

There is increasing interest in the use of high-speed serial data communication for exchange of data between electronic devices. There are many possible protocols for such high-speed serial interfaces. Some of these protocols may be industry-standard protocols. Other protocols may be custom-designed for particular systems.

Examples of industry-standard protocols include PCI Express® (Peripheral Component Interconnect Express), XAUI (X Attachment Unit Interface), sRIO (serial Rapid IO), and many others. PCI Express® is a point-to-point serial interface introduced by Intel Corporation of Santa Clara, Calif., and may be used, for example, as an expansion card interface for computer systems. XAUI is a 10 gigabit per second serial interface which may be used, for example, as a chip-to-chip interface. sRIO is a high-performance packet-switched interface technology which may also be used as a chip-to-chip interface.

SUMMARY

The present application discloses apparatus and methods for providing a serial interface with shared datapaths. The apparatus and methods share or re-use components from multiple lower-speed datapaths so as to efficiently provide a higher-speed datapath. In one embodiment, physical coding sublayer circuitry of the lower-speed datapaths is also used by the higher-speed datapath. In another embodiment, physical media access circuitry of the lower-speed data paths is also used by the higher-speed datapath. Other embodiments, aspects and features are also disclosed.

DETAILED DESCRIPTION

The ever increasing speed of serial data interfaces requires progressively wider datapaths to process data. However, dedicated wide datapaths are costly in terms of die area, power consumption, signal congestion, and timing closure requirements. With the use of a multiple-speed data interface on a same die, the use of a dedicated wide datapath for each interface speed is especially costly.

The present patent application discloses an innovative solution to the above-described challenges and difficulties. Circuit designs are disclosed herein which enable the efficient re-use or sharing of particular resources from two lower-speed datapaths for a single higher-speed datapath. One embodiment enables the re-use or sharing of lower-speed PCS (physical coding sublayer) resources, such as phase compensation buffer, for the higher-speed datapath. Another embodiment enables the re-use or sharing of lower-speed PMA (physical media access) resources, such as lower-speed SERDES (serializer-deserializer) circuitry for the higher-speed datapath. These and other embodiments are described in further detail below.

As mentioned above, a serial interface may include PCS circuitry and PMA circuitry. The PCS circuitry generally provides digital logic functions which implement data communication protocols (or portions thereof), while the PMA circuitry generally provides mixed (analog/digital) signal functionality for the data communications. For example, a PMA channel may be configured to perform, among other operations, serialization of data to be transmitted (conversion from parallel to serial) and de-serialization of received data (conversion from serial to parallel). For certain protocols, a PCS channel may be configured to perform, among other functions, 64-bit to 66-bit encoding for data to be sent to the PMA channel and 66-bit to 64-bit decoding for data received from the PMA channel. PCS channels may also perform phase compensation using FIFO (first-in first-out) buffers.

Figure 1:
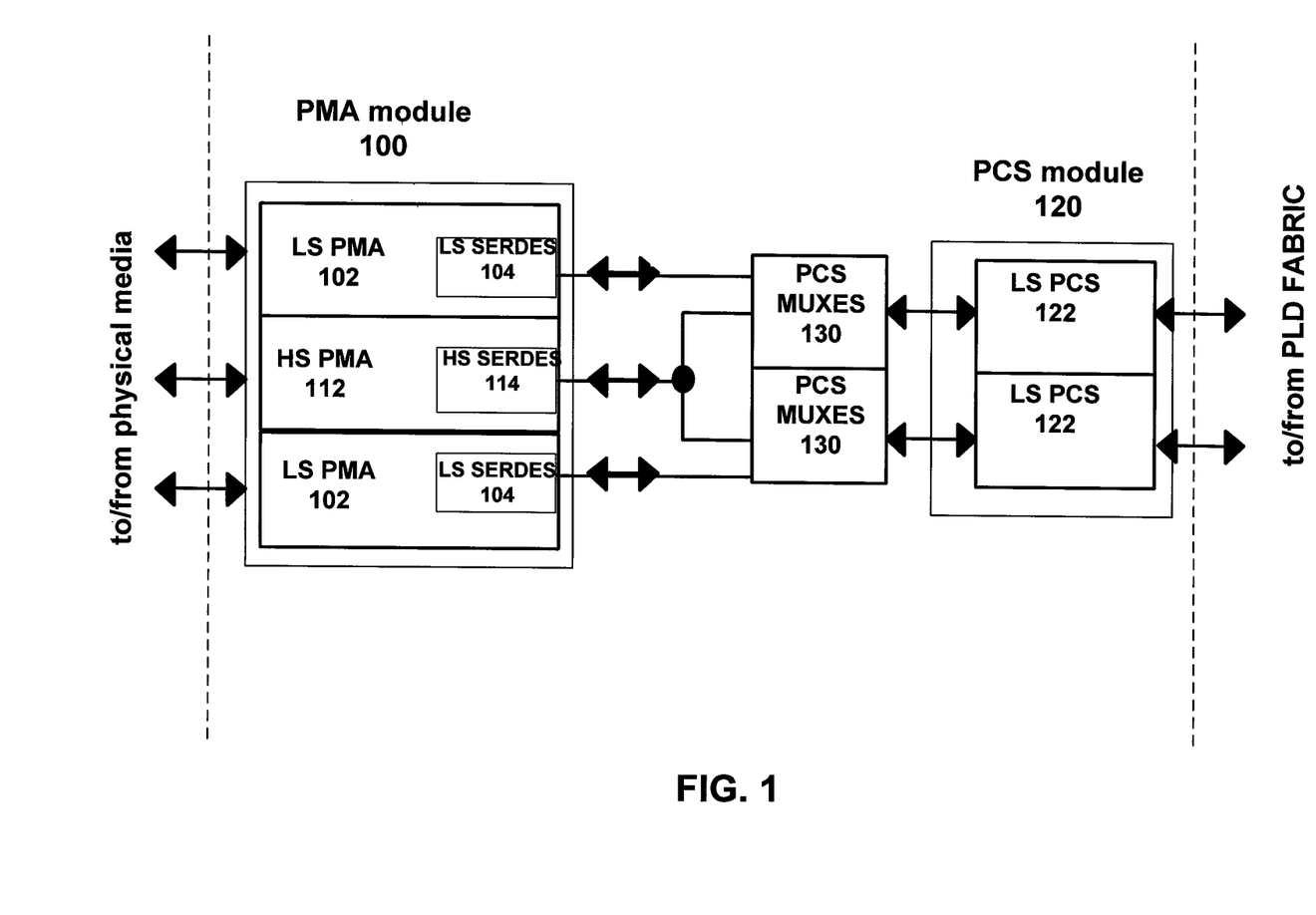
FIG. 1 depicts serial interface circuitry arranged with datapaths that share PCS channels in accordance with an embodiment of the invention.

FIG. 1 depicts serial interface circuitry arranged with datapaths that share PCS channels in accordance with an embodiment of the invention. As shown, the serial interface circuitry includes a PMA module 100, a PCS module 120, and two blocks of PCS multiplexers (PCS MUXES) 130 arranged between the PMA and PCS modules. The PMA module 100 interfaces with the physical media of the serial data links. In the particular embodiment shown, the PCS module 120 interfaces with the PLD (progammable logic device) fabric (also known as the PLD core) within the integrated circuit.

The PMA module 100 includes two lower-speed PMA (LS PMA) channels 102 and a single higher-speed PMA (HS PMA) channel 112 arranged between them. As shown in FIG. 1, each LS PMA channel 102 may include a lower-speed SERDES (LS SERDES) 104, and the HS PMA channel 112 may include a higher-speed SERDES (HS SERDES) 114. The HS SERDES 114 may operate at a serial data transfer speed which is twice the serial data transfer speed of each LS SERDES 104.

The PCS module 120 includes two lower-speed PCS (LS PCS) channels 122. Advantageously, no higher-speed PCS circuit is needed. This is due to sharing of the two LS PCS channels 122 between the lower-speed datapaths and the higher-speed datapath.

The two PCS MUXES 130 are arranged to enable sharing of the LS PCS channels 122. On one side, each PCS MUXES 130 is arranged to interface with the HS PMA channel 112 and a corresponding LS PMA channel 102. On the other side, each PCS MUXES 130 is arranged to interface with a corresponding LS PCS channel 122.

The serial interface circuitry shown in FIG. 1 may be configured (programmed) to operate in one of two modes. A first operating mode is for lower-speed data transfer over two channels, and a second operating mode is for higher-speed data transfer over a single channel.

In the first operating mode, each PCS MUXES 130 has its interface with the LS PMA channel 102 activated and has its interface with the HS PMA channel 112 deactivated. In other words, each PCS MUXES 130 is configured or programmed to interconnect a corresponding LS SERDES 104 to a corresponding LS PCS channel 122. In this manner, two lower-speed data channels may be created.

In the second operating mode, each PCS MUXES 130 has its interface with the LS PMA channel 102 deactivated and has its interface with the HS PMA channel 112 activated. In other words, each PCS MUXES 130 is configured or programmed to interconnect the HS SERDES 114 to both LS PCS channels 122. In this manner, a single higher-speed data channel may be created.

Figure 2A:
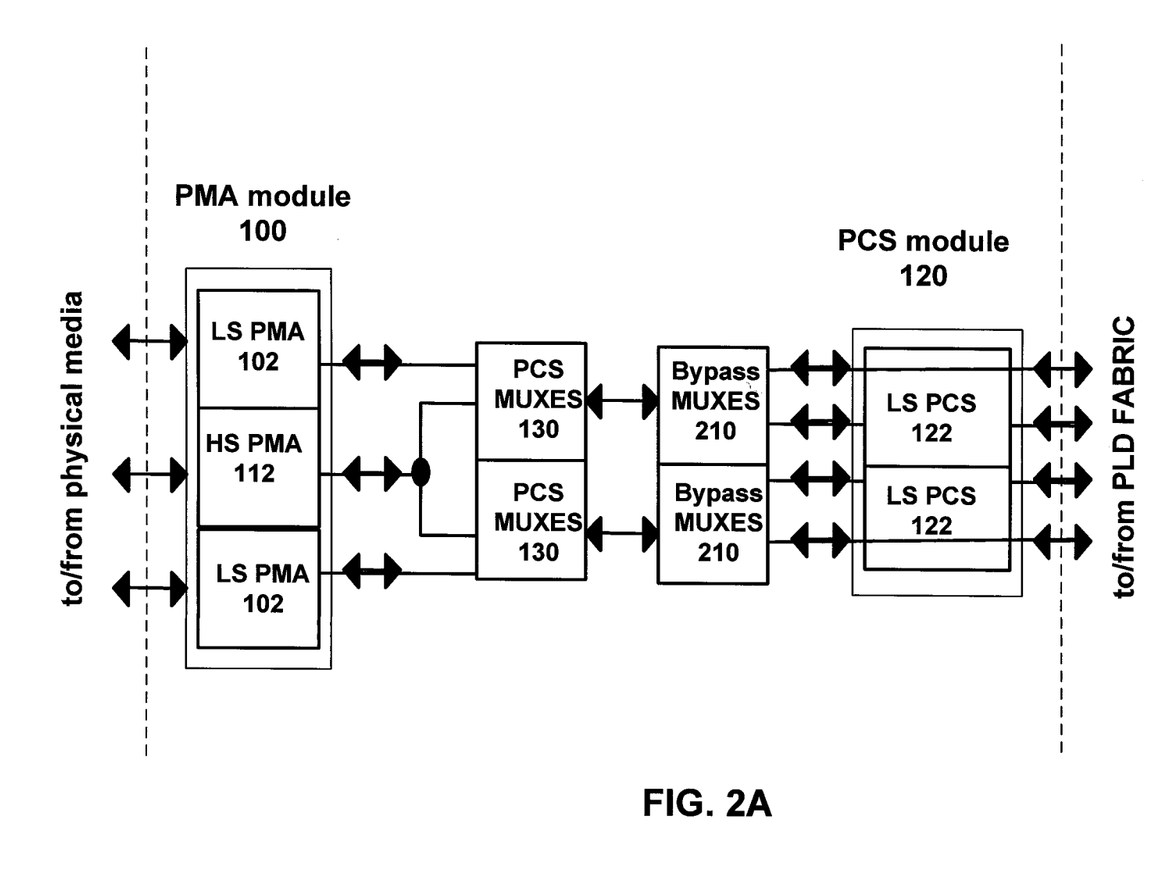
FIG. 2A depicts serial interface circuitry arranged with datapaths that share bypassable PCS channels in accordance with an embodiment of the invention.

FIG. 2A depicts serial interface circuitry arranged with datapaths that share bypassable PCS channels in accordance with an embodiment of the invention. Similar to the circuitry in FIG. 1, the circuitry in FIG. 2A includes a PMA module 100 and a PCS module 120, and the two blocks of PCS multiplexers (PCS MUXES) 130 for sharing of the two LS PCS channels 122 in the PCS module 120. In addition, the circuitry in FIG. 2A includes two blocks of bypass multiplexers (bypass MUXES) 210 for optionally bypassing the PCS module 120.

As shown in FIG. 2A, each bypass MUXES 210 is arranged, on one side, with connections to a corresponding PCS MUXES 130 and, on the opposite side, with connections to a corresponding LS PCS channel 122 and connections which go directly to the PLD fabric (bypassing the corresponding LS PCS circuit 122). Advantageously, the two bypass MUXES 210 enable an optional direct mode of operation in which the PMA module 100 interfaces directly with the PLD fabric, bypassing the PCS module 120.

In the normal (non-bypass) operating mode, each bypass MUXES 210 has its connections to the corresponding LS PCS channel 122 activated and has its direct connections to the PLD fabric deactivated. In other words, in this mode, each of the bypass MUXES 210 is configured or programmed to interconnect one of the PCS MUXES 130 to a corresponding LS PCS channel 122.

In the bypass operating mode, each bypass MUXES 210 has its connections to the corresponding LS PCS channel 122 deactivated and has its direct connections to the PLD fabric activated. In other words, in this mode, each bypass MUXES 210 is configured or programmed to interconnect one of the PCS MUXES 130 directly to the PLD fabric (bypassing the PCS module 120).

Figure 2B:
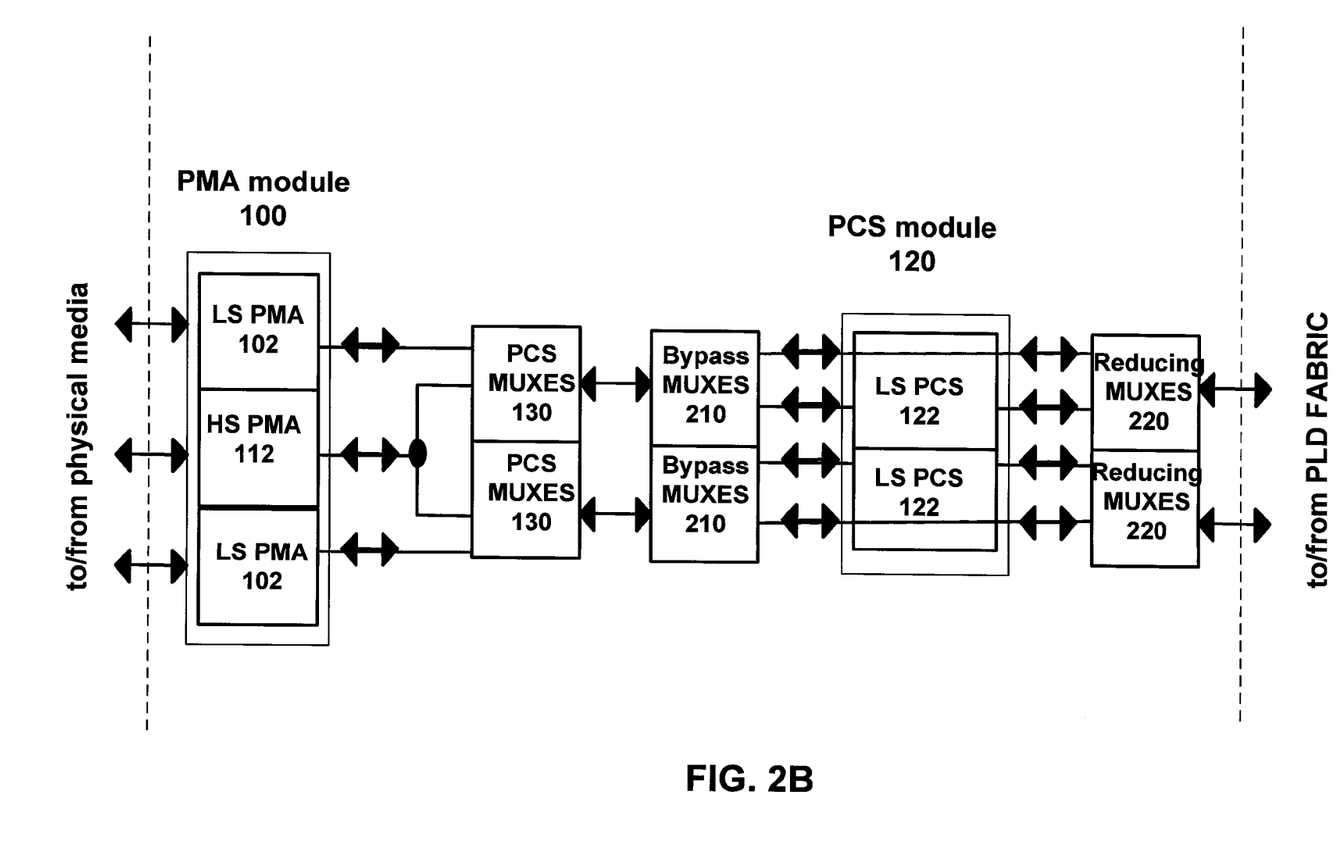
FIG. 2B depicts serial interface circuitry arranged with datapaths that share bypassable PCS channels with a reduced number of signals to the PLD core in accordance with an embodiment of the invention.

FIG. 2B depicts serial interface circuitry arranged with datapaths that share bypassable PCS channels with a reduced number of signals to the PLD core in accordance with an embodiment of the invention. Similar to the circuitry in FIG. 2A, the circuitry in FIG. 2B also includes a PMA module 100 and a PCS module 120, the two PCS MUXES 130, and the two bypass MUXES 210. In addition, the circuitry in FIG. 2B includes two blocks of reducing multiplexers (reducing MUXES) 220 for reducing a number of interface lines between the PLD fabric and the serial interface circuitry.

As shown in FIG. 2B, each reducing MUXES 220 is arranged, on one side, with a larger number of connections to the LS PCS channels 122 and the bypass MUXES 210 and, on the opposite side, with a smaller number of connections to the PLD fabric. Advantageously, the two reducing MUXES 220 are used to reduce by half the number of signal lines to/from the PLD fabric.

In the normal (non-bypass) operating mode, each reducing MUXES 220 has its connections to the corresponding LS PCS channel 120 activated and has its direct connections to the corresponding bypass MUXES 210 deactivated. In other words, in this mode, each reducing MUXES 220 is configured or programmed to interconnect the corresponding LS PCS channel 122 to the PLD fabric.

In the bypass operating mode, each reducing MUXES 220 has its connections to the corresponding LS PCS channel 120 deactivated and has its direct connections to the corresponding bypass MUXES 210 activated. In other words, in this mode, each reducing MUXES 220 is configured or programmed to interconnect the corresponding bypass MUXES 210 to the PLD fabric.

Figure 3:
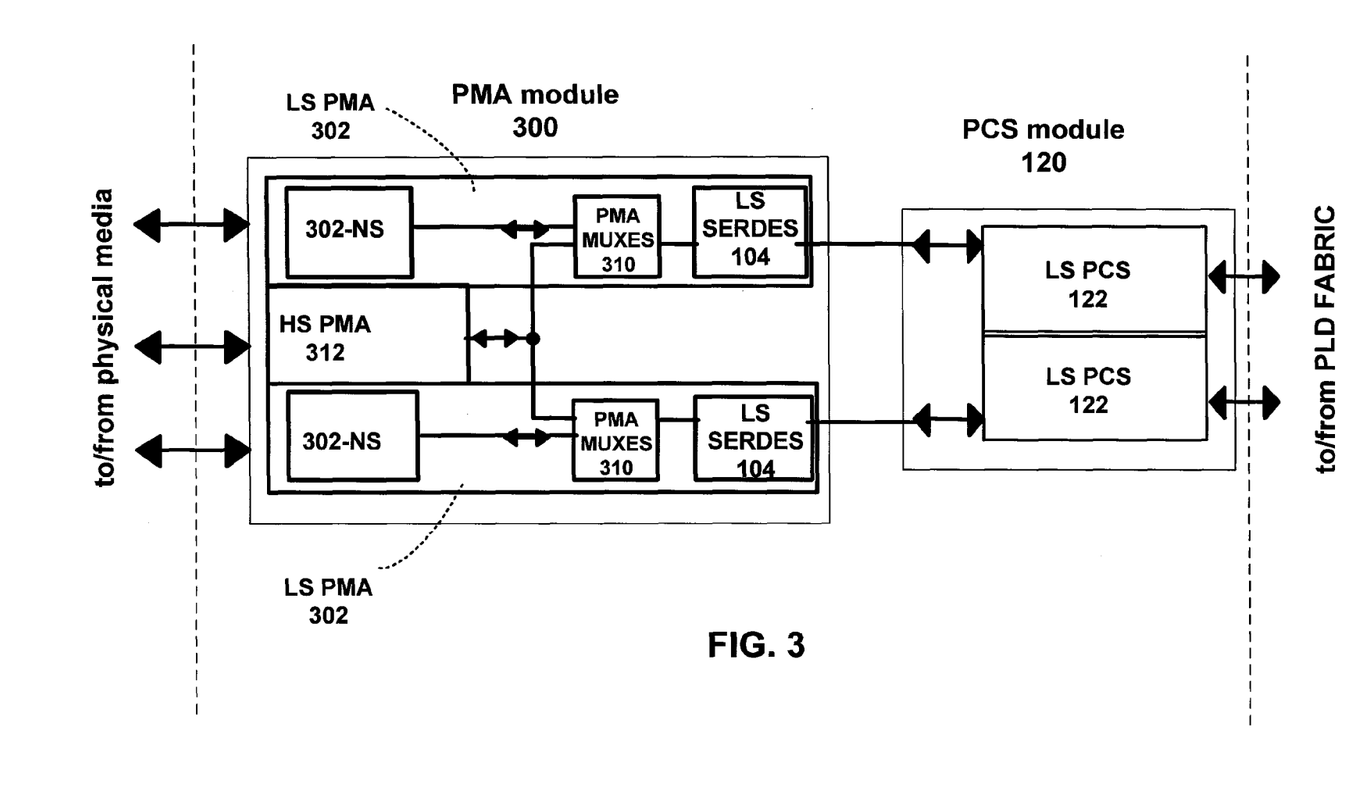
FIG. 3 depicts serial interface circuitry arranged with datapaths that share SERDES and PCS channels in accordance with an embodiment of the invention.

FIG. 3 depicts serial interface circuitry arranged with datapaths that share SERDES circuits and PCS modules in accordance with an embodiment of the invention. As shown, the serial interface circuitry includes a PMA module 300 and a PCS module 120. The PMA module 300 interfaces with the physical media of the serial data links. In the particular embodiment shown, the PCS module 120 interfaces with the PLD fabric (also known as the PLD core) within the integrated circuit.

The PCS module 120 includes two lower-speed PCS (LS PCS) blocks 122. Advantageously, no higher-speed PCS channel is needed. This is due to sharing of the two LS PCS channels 122 by the two lower-speed datapaths and the higher-speed datapath.

The PMA module 300 includes two lower-speed PMA (LS PMA) channels 302 and a single higher-speed PMA (HS PMA) channel 312 arranged between them. As shown in FIG. 3, each LS PMA channel 302 may include a lower-speed serializer-deserializer (LS SERDES) 104 which interfaces with a corresponding one of the LS PCS channels 122. Advantageously, in this embodiment, a conventional higher-speed SERDES is not needed for the HS PMA channel 312. This is due to sharing of the two LS SERDES 104 by the lower-speed datapaths and the higher-speed datapath.

In accordance with this embodiment, each LS PMA channel 302 is arranged with PMA multiplexers (PMA MUXES) 310 to enable sharing of both the LS SERDES 104 and the LS PCS channels 122. On one side (the right side in FIG. 3), each PMA MUXES 310 is arranged to connect to the LS SERDES 104 in the LS PMA block 302. On the opposite side (the left side in FIG. 3), each PMA MUXES 310 is arranged to connect either to non-SERDES circuitry 302-NS in the LS PMA channel 302, or to the HS PMA channel 312. The non-SERDES circuitry 302-NS may include clock data recovery, transmission driver, and a transmission phase-locked loop, for example.

The serial interface circuitry shown in FIG. 3 may be configured (programmed) to operate in one of two modes. A first operating mode is for lower-speed data transfer over two channels, and a second operating mode is for higher-speed data transfer over a single channel.

In the first operating mode, each PMA MUXES circuit 310 has its interface with the non-SERDES circuitry 302-NS in the LS PMA block 302 activated and has its interface with the HS PMA channel 312 deactivated. In other words, each PMA MUXES 310 is configured or programmed to interconnect the LS SERDES 104 to the non-SERDES circuitry 302-NS within its LS PMA channel 302. In this manner, two lower-speed data channels may be created.

In the second operating mode, each PMA MUXES circuit 310 has its interface with the non-SERDES circuitry 302-NS in the LS PMA channel 302 deactivated and has its interface with the HS PMA channel 312 activated. In other words, each PMA MUXES 310 is configured or programmed to interconnect the LS SERDES circuit 104 within its LS PMA channel 302 to the HS PMA channel 312. In this manner, a single higher-speed data channel may be created.

Figure 4:
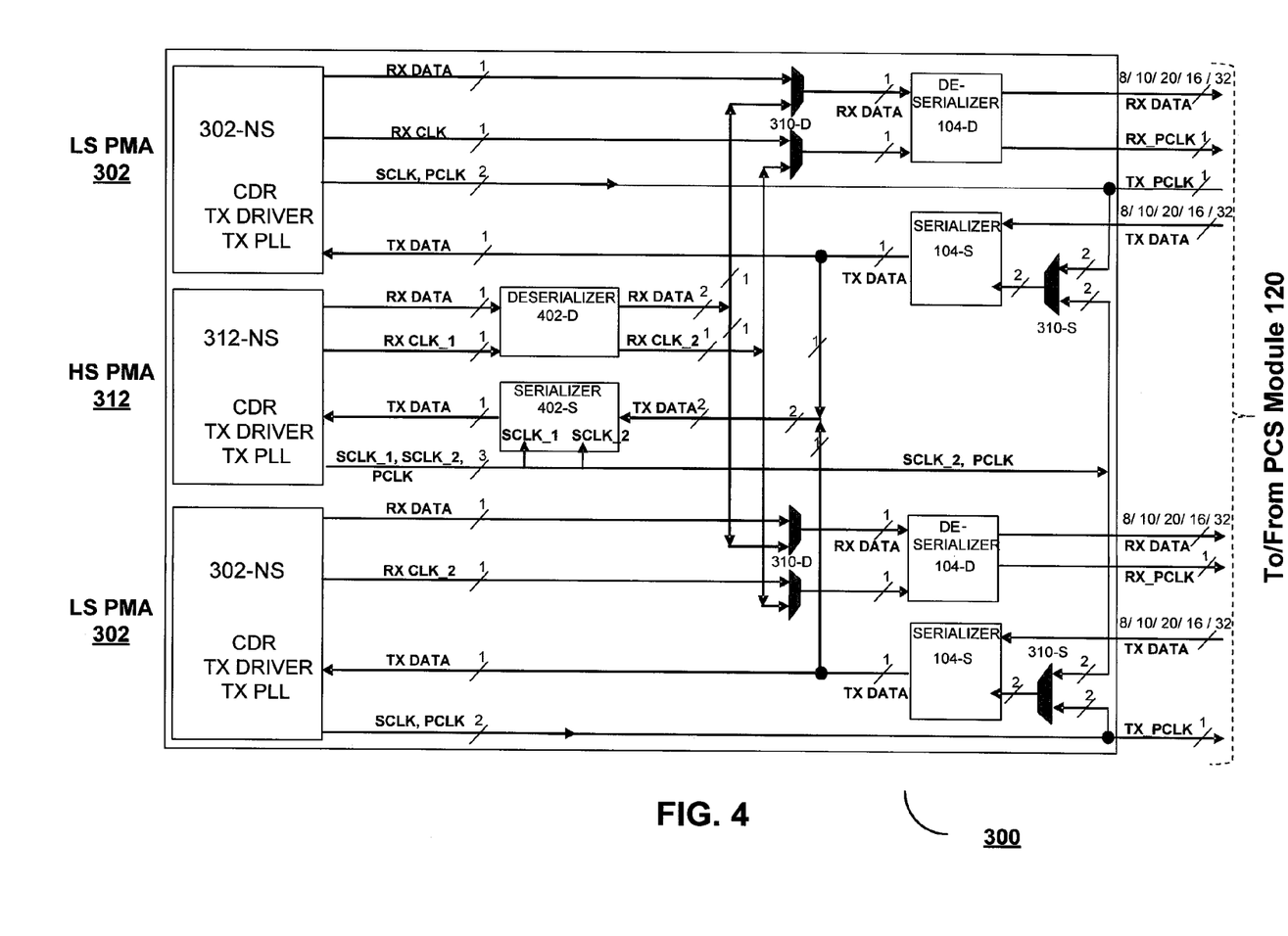
FIG. 4 shows a PMA module of FIG. 3 in further detail in accordance with an embodiment of the invention.

FIG. 4 shows a PMA module 300 of FIG. 3 in further detail in accordance with an embodiment of the invention. As shown, each LS PMA channel 302 may include serializing PMA MUXES 310-S, deserializing PMA MUXES 310-D, serializer 104-S, deserializer 104-D, and lower-speed non-SERDES circuitry 302-NS. The HS PMA channel 312 may include 2:1 serializer 402-S, 1:2 deserializer 402-D, and higher-speed non-SERDES circuitry 312-NS. The higher-speed non-SERDES circuitry 312-NS for the HS PMA channel 312 may include, among other circuitry, higher-speed clock data recovery (CDR) circuitry, higher-speed transmission (TX) drivers, and higher-speed transmission phase-locked loops (TX PLLs).

Transmission data (TX DATA) may be received via a plurality of lines (for example, 8, 10, 20, 16 or 32 lines) from the PCS module 120 by each serializer 104-S. In other words, each serializer 104-S may be an 8/10/20/16/32:1 serializer. In addition, each serializer 104-S receives either a serial clock signal (SCLK) and a parallel clock signal (PCLK) from the local LS PMA channel 302, or a half-rate serial clock signal (SCLK_2) and a parallel clock signal (PCLK) from the HS PMA channel 312. A serializing PMA MUXES 310-S may be used to select which pair of clock signals are to be used by each serializer 104-S. Each serializer 104-S outputs a serial transmission data signal along one line to the lower-speed non-SERDES circuitry 302-NS of the local LS PMA channel 302 and also to the 2:1 serializer 402-S for the HS PMA channel 312.

The 2:1 serializer 402-S receives the transmission data (TX DATA) from the two serializers 104-S and also receives full-rate and half-rate serial clock signals (SCLK_1 and SCLK_2, respectively) from the HS PMA channel 312. The 2:1 serializer 402-S uses these serial clock signals to provide timing for serializing the transmission data (TX DATA) to the higher-speed non-SERDES circuitry 312-NS of the HS PMA channel 312.

In one mode of operation, each serializer 104-S may use the pair of clock signals (SCLK and PCLK) from the local LS PMA channel 302 such that the transmission data may be output from the two LS PMA channels 302. In another mode of operation, each serializer 104-S may use the pair of clock signals (SCLK_2, PCLK) from the HS PMA channel 312 such that the transmission data may be output from the HS PMA channel 312.

The 1:2 deserializer 402-D receives the received serial data (RX DATA) and a full-rate receive clock signal (RX CLK_1) from the higher-speed non-SERDES circuitry 312-NS of the HS PMA channel 312. (Note that the 2:1 serializer and the 1:2 deserializer may be referred to, together, as a 1:2 SERDES.) The 1:2 deserializer 402-D effectively deserializes the received serial data into a 2-bit-wide bus at half-rate, one bit of the bus going to each of the two deserializing PMA MUXES 310-D. For example, the "odd" bits of the 2-bit wide bus may be sent to the upper PMA MUXES 310-D, and the "even" bits of the 2-bit wide bus may be sent to the lower PMA MUXES 310-D. In addition, the 1:2 deserializer 402-D outputs a half-rate receive clock signal (RX CLK_2) to each of the two deserializing PMA MUXES 310-D.

Each deserializer 104-D receives the received data (RX DATA) from either the non-SERDES circuitry 302-NS of the local LS PMA channel 302, or from the 1:2 deserializer 402-D. In addition, each deserializer 104-D receives either the lower-rate receive clock signal (RX CLK) from the non-SERDES circuitry 302-NS of the local LS PMA channel 302, or the half-rate receive clock signal (RX CLK_2) from the 1:2 deserializer 402-D. The deserializing PMA MUXES 310-D may be used to select which data and clock signals are to be used by the deserializers 104-D. The received data (RX DATA) may be output via a plurality of lines (for example, 8, 10, 20, 16 or 32 lines) to the PCS module 120 by each deserializer 104-D. In other words, each deserializer 104-D may be a 1:8/10/20/16/32 deserializer.

In one mode of operation, each deserializer 104-D may use the data and clock signals (RX DATA and RX CLK) from the local LS PMA channel 302 such that the data received from the two LS PMA channels 302 is processed. In another mode of operation, each deserializer 104-D may use the data and clock signals (RX DATA and RX CLK_2) from the 1:2 deserializer 402-D such that the data received from the HS PMA channel 312 is processed.

Note that while embodiments with two lower-speed data channels per higher-speed data channel are described above, other embodiments may have, more generally, N lower-speed data channels per higher-speed data channel.

Figure 5:
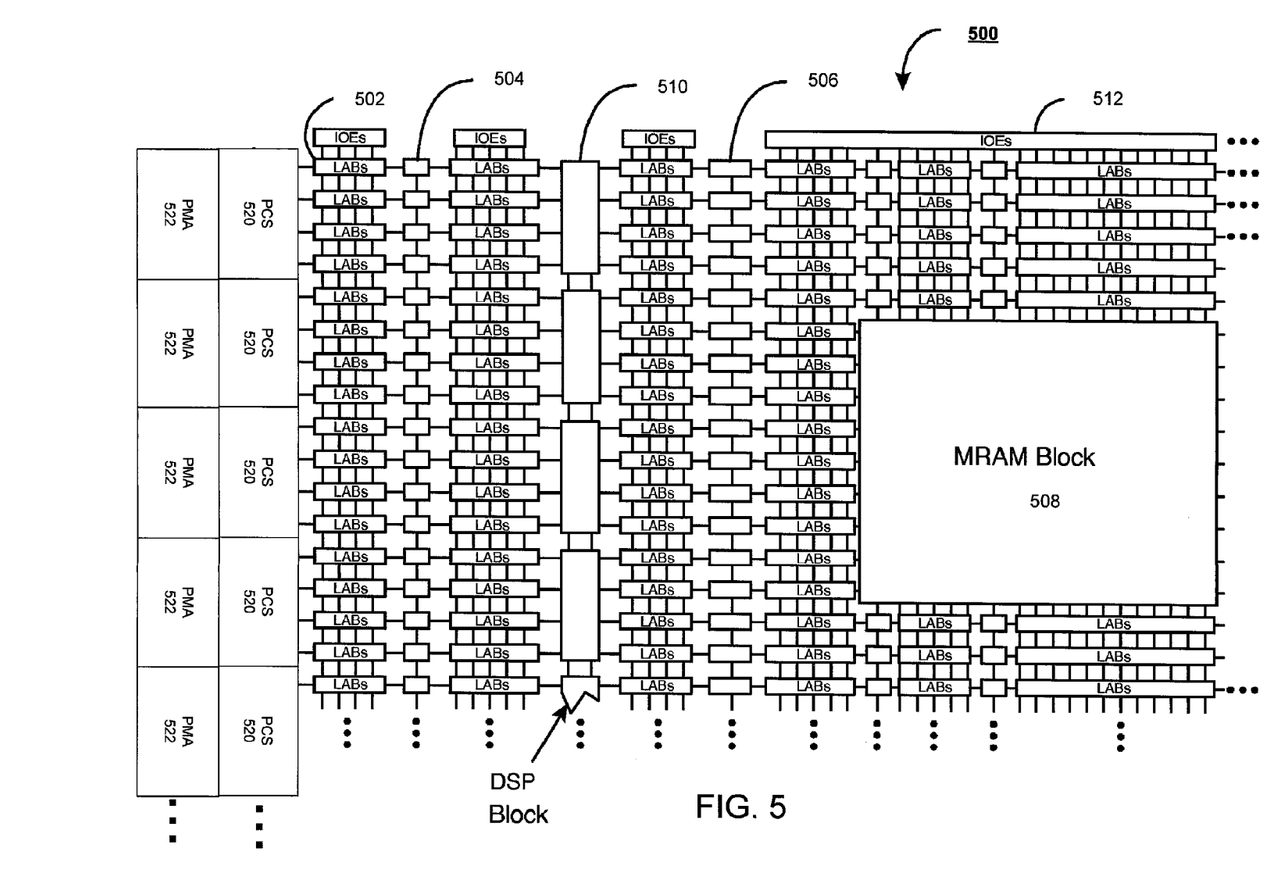
FIG. 5 is a simplified partial block diagram of a field programmable gate array (FPGA) that may be configured to implement an embodiment of the present invention.

FIG. 5 is a simplified partial block diagram of a field programmable gate array (FPGA) 500 that can include aspects of the present invention. It should be understood that embodiments of the present invention can be used in numerous types of integrated circuits such as: programmable logic devices (PLDs), including field programmable gate arrays (FPGAs), complex programmable logic devices (CPLDs), and programmable logic arrays (PLAs); digital signal processors (DSPs) application specific integrated circuits (ASICs), and systems on programmable chips (SOPCs).

The FPGA 500 includes within its "core" or "fabric" a two-dimensional array of programmable logic array blocks (or LABs) 502 that are interconnected by a network of column and row interconnect conductors of varying length and speed. LABs 502 include multiple (e.g., 10) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration. A serial programming interface may be used to program the configurable elements within the FPGA 500.

The FPGA 500 may also include a distributed memory structure including random access memory (RAM) blocks of varying sizes provided throughout the array. The RAM blocks include, for example, blocks 504, blocks 506, and block 508. These memory blocks can also include shift registers and FIFO buffers.

The FPGA 500 may further include digital signal processing (DSP) blocks 510 that can implement, for example, multipliers with add or subtract features. Input/output elements (IOEs) 512 located, in this example, around the periphery of the chip support numerous single-ended and differential input/output standards. Each IOE 512 is coupled to an external terminal (i.e., a pin) of FPGA 500. PCS modules 520 and PMA modules 522 may be arranged in an array at an edge of the chip, as shown, or may be distributed in the core array (in a similar fashion as the RAM and DSP blocks) and interconnected by a network of column and row interconnect conductors. In accordance with an embodiment of the invention, the PCS modules 520 and the PMA modules 522 may be arranged with circuitry as described herein for providing serial interfaces with shared datapaths.

It is to be understood that FPGA 500 is described herein for illustrative purposes only and that the present invention can be implemented in many different types of PLDs and other integrated circuits.

Figure 6:
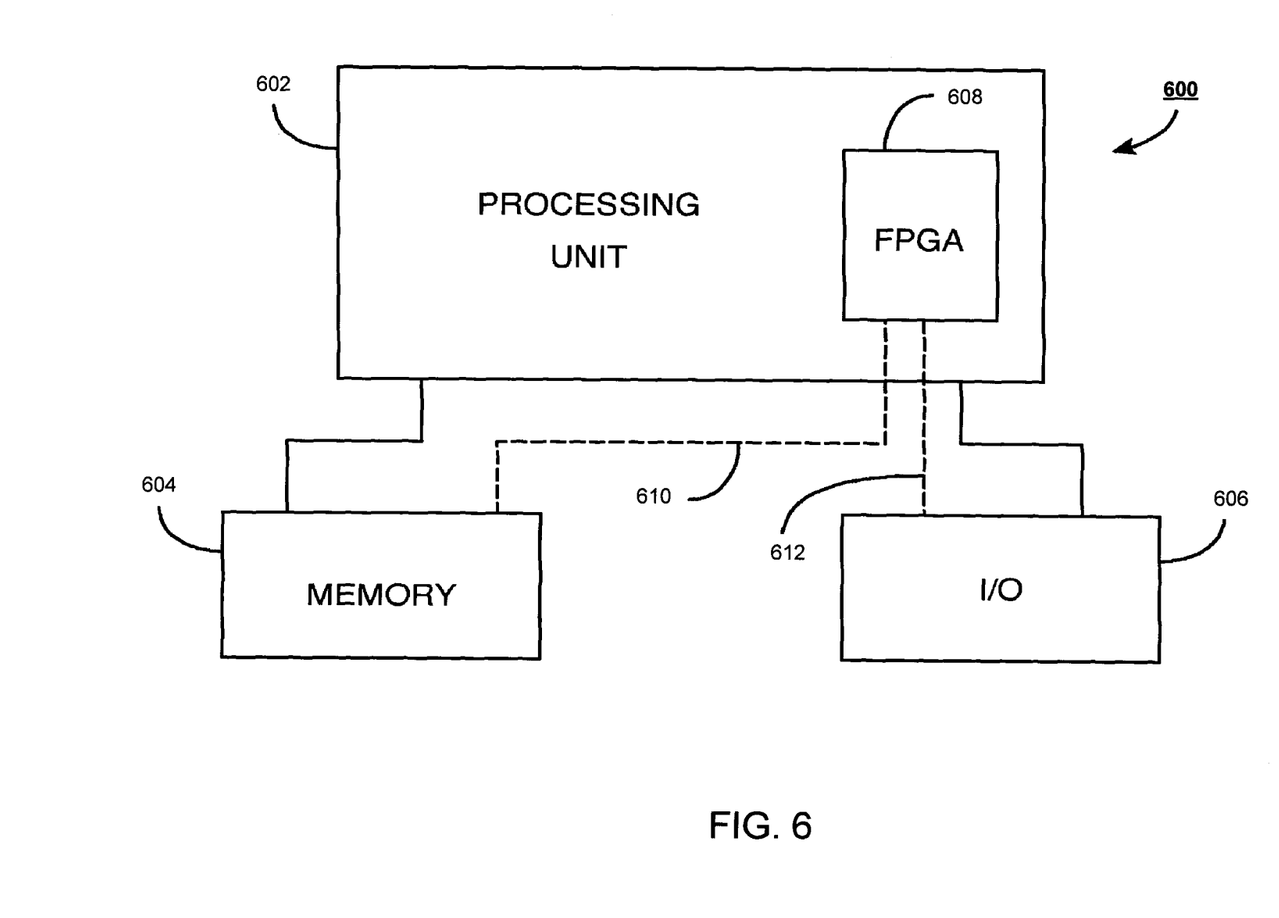
FIG. 6 shows a block diagram of an exemplary digital system that may be configured to utilize an embodiment of the present invention.

The present invention can also be implemented in a system that has a FPGA as one of several components. FIG. 6 shows a block diagram of an exemplary digital system 600 that can embody techniques of the present invention. System 600 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 600 may be provided on a single board, on multiple boards, or within multiple enclosures.

System 600 includes a processing unit 602, a memory unit 604, and an input/output (I/O) unit 606 interconnected together by one or more buses. According to this exemplary embodiment, FPGA 608 is embedded in processing unit 602. FPGA 608 can serve many different purposes within the system 600. FPGA 608 can, for example, be a logical building block of processing unit 602, supporting its internal and external operations. FPGA 608 is programmed to implement the logical functions necessary to carry on its particular role in system operation. FPGA 608 can be specially coupled to memory 604 through connection 610 and to I/O unit 606 through connection 612.

Processing unit 602 may direct data to an appropriate system component for processing or storage, execute a program stored in memory 604, receive and transmit data via I/O unit 606, or other similar function. Processing unit 602 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 608 may control the logical operations of the system. As another example, FPGA 608 acts as a reconfigurable processor that may be reprogrammed as needed to handle a particular computing task. Alternately, FPGA 608 may itself include an embedded microprocessor. Memory unit 604 may be a random access memory (RAM), read only memory (ROM), fixed or flexible disk media, flash memory, tape, or any other storage means, or any combination of these storage means.

In accordance with one embodiment of the invention, a serial interface includes a plurality of lower-speed serializer-deserializer circuits, a higher-speed serializer-deserializer circuit, a plurality of physical coding sublayer channels, and a first plurality of multiplexers. The first plurality of multiplexers is arranged to connect the plurality of physical coding sublayer channels to the plurality of the lower-speed serializer-deserializer circuits to in a first configuration and to connect the plurality of physical coding sublayer channels to the higher-speed serializer-deserializer circuit in a second configuration.

In accordance with another embodiment, a serial interface includes a plurality of lower-speed physical media attachment channels, a higher-speed physical media attachment channel, and a plurality of multiplexers. Each physical media attachment channel includes a lower-speed serializer-deserializer (SERDES) circuit and lower-speed non-SERDES circuitry, while the higher-speed physical media attachment channel includes higher-speed non-SERDES circuitry. The plurality of multiplexers are arranged to connect a lower-speed SERDES circuits to a lower-speed non-SERDES circuitry in each lower-speed physical media attachment channel in a first configuration and to connect the plurality of lower-speed SERDES circuits to the higher-speed physical media attachment channel in a second configuration.

Another embodiment relates to a method of configuring serial communication interfaces on an integrated circuit. A first multiplexer may be programmed to select a first SERDES circuit of a first plurality of SERDES circuits for interconnection to a digital logic circuit for a first serial communication channel. In addition, a second multiplexer may be programmed to select a second SERDES circuit of a second plurality of SERDES circuits for interconnection to a digital logic circuit for a second serial communication channel. In one implementation, the first plurality of SERDES circuits may comprise a first lower-speed SERDES circuit and a higher-speed SERDES circuit, and the second plurality of SERDES circuits may comprise a second lower-speed SERDES circuit and the higher-speed SERDES circuit. The first and second multiplexers may be programmed in a first operating mode to interconnect the first and second lower-speed SERDES circuits to the digital logic circuits for the first and second serial communication channels, and the first and second multiplexers may be programmed in a second operating mode to interconnect the higher-speed SERDES circuit to the digital logic circuits for the first and second serial communication channels.

Another embodiment relates to another method of configuring serial communication interfaces on an integrated circuit. A first multiplexer may be programmed to select a first clock data recovery circuit of a first plurality of clock data recovery circuits for interconnection to a first serial-deserializer circuit. In addition, a second multiplexer may be programmed to select a second clock data recovery circuit of a second plurality of clock data recovery circuits for interconnection to a second serializer-deserializer circuit. In one implementation, the first plurality of clock data recovery circuits comprises a first lower-speed clock data recovery circuit and a higher-speed clock data recovery circuit, and the second plurality of clock data recovery circuits comprises a second lower-speed clock data recovery circuit and the higher-speed clock data recovery circuit. The first and second multiplexers may be programmed in a first operating mode to interconnect the first and second lower-speed clock data recovery circuits to the first and second serializer-deserializer circuits. The first and second multiplexers may be programmed in a second operating mode to interconnect the higher-speed clock data recovery circuit to the first and second serializer-deserializer circuits.

In accordance with another embodiment, a higher-speed serial data stream is received by a higher-speed physical media attachment channel which includes a higher-speed deserializer circuit. The higher-speed serial data stream is de-serialized by the higher-speed deserializer circuit to create parallel data streams. The parallel data streams are separated or divided into N sub-groups. Each of the N sub-groups of the parallel data streams are sent to a corresponding channel of N lower-speed physical coding sublayer channels, and the N sub-groups of the parallel data streams may be decoded by the N lower-speed physical coding sublayer channels to create N sub-groups of decoded data streams, which may be output to a programmable logic device core.

In accordance with another embodiment, a higher-speed serial data stream is received by a higher-speed physical media attachment channel which includes a 1:N deserializer circuit. The serial received data stream is de-serialized to N received data streams by the 1:N deserializer circuit. Subsequently, the N received data streams are de-serialized by N lower-speed deserializer circuits to create N sub-groups of parallel data streams. The N sub-groups of parallel data streams may be sent to N lower-speed physical coding sublayer channels, and the N sub-groups of parallel data streams may be decoded using the N lower-speed physical coding sublayer channels to form N sub-groups of decoded parallel data streams, which may be output to a programmable logic device core.

In accordance with another embodiment, N sub-groups of parallel transmission data streams are received by N lower-speed physical coding sublayer channels. The N sub-groups of parallel transmission data streams are encoded by the N lower-speed physical coding sublayer channels to form N sub-groups of encoded data streams. The N sub-groups of encoded data streams are sent in parallel to a higher-speed serializer circuit, which serializes the N sub-groups of encoded data to form a higher-speed serial transmission data stream.

In accordance with another embodiment, N sub-groups of parallel transmission data streams are received by N lower-speed physical coding sublayer channels. The N sub-groups of parallel transmission data streams are encoded by the N lower-speed physical coding sublayer channels to form N sub-groups of encoded data streams. The N sub-groups of encoded data streams are serialized by N lower-speed serializer circuits to create N lower-speed serial transmission data streams, which are further serialized to form a higher-speed serial transmission data stream.

In an implementation of the above-described embodiments, N may be equal to two. In other implementations, N may be a number larger than two.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A serial interface comprising:
a plurality of lower-speed serializer-deserializer circuits;
a higher-speed serializer-deserializer circuit that is distinct from the plurality of lower-speed serializer-deserializer circuits and operates at a faster serial data transfer rate than the lower-speed serial-deserializer circuits;
a plurality of physical coding sublayer channels; and
a first plurality of multiplexers arranged to connect the plurality of physical coding sublayer channels to the plurality of the lower-speed serializer-deserializer circuits in a first configuration and to connect the plurality of physical coding sublayer channels to the higher-speed serializer-deserializer circuit in a second configuration.

2. The serial interface of claim 1, wherein each physical coding sublayer channel is arranged to perform decoding of received data and encoding of data to be transmitted.

3. The serial interface of claim 1, further comprising:
a programmable logic device core; and
a second plurality of multiplexers that is distinct from the first plurality of multiplexers and is arranged to connect the first plurality of multiplexers to the plurality of physical coding sublayer channels in a first configuration and to connect the first plurality of multiplexers to the programmable logic device core while bypassing the physical coding sublayer channels in a second configuration.

4. The serial interface of claim 3, further comprising:
a third plurality of multiplexers that is distinct from the first and second pluralities of multiplexers and is arranged to connect the plurality of physical coding sublayer channels to the programmable logic device core in a first configuration and to connect the second plurality of multiplexers to the programmable logic device core while bypassing the physical coding sublayer channels in a second configuration.

5. The serial interface of claim 1, further comprising:
a physical media attachment module having the higher-speed serializer-deserializer circuit physically located in between two lower-speed serializer-deserializer circuits,
wherein two physical coding sublayer channels are having two lower-speed serializer-deserializer circuits connected to the two lower-speed serializer-deserializer circuits in the first configuration and are connected the higher-speed serializer-deserializer circuit in the second configuration.

6. A serial interface comprising:
a plurality of lower-speed physical media attachment channels, each lower-speed physical media attachment channel including a lower-speed serializer-deserializer (SERDES) circuit and lower-speed non-SERDES circuitry which includes a lower-speed clock data recovery circuit;
a higher-speed physical media attachment channel including higher-speed non-SERDES circuitry which includes a higher-speed clock data recovery circuit; and
a plurality of multiplexers arranged to connect a lower-speed SERDES circuits to a lower-speed non-SERDES circuitry in each lower-speed physical media attachment channel in a first configuration and to connect the plurality of lower-speed SERDES circuits to the higher-speed physical media attachment channel in a second configuration.

7. The serial interface of claim 6, further comprising:
a plurality of physical coding sublayer channels connected to the plurality of lower-speed SERDES circuits.

8. The serial interface of claim 7, wherein each physical coding sublayer channel is arranged to perform decoding of received data and encoding of data to be transmitted.

9. The serial interface of claim 6, wherein the plurality of lower-speed SERDES circuits comprise N lower-speed SERDES circuits connected to the higher-speed physical media attachment channel in the second configuration, and further comprising a 1:N SERDES circuit arranged to couple the higher-speed non-SERDES circuitry, including the higher-speed clock data recovery circuit, to the plurality of lower-speed SERDES circuits.

10. The serial interface of claim 6, wherein the plurality of lower-speed SERDES circuits comprise two lower-speed SERDES circuits connected to the higher-speed physical media attachment channel in the second configuration, and further comprising a 1:2 SERDES circuit arranged to couple the higher-speed non-SERDES circuitry, including the higher-speed clock data recovery circuit, to the plurality of lower-speed SERDES circuits.

11. A method of configuring serial communication interfaces on an integrated circuit, the method comprising:
programming a first multiplexer to select a first serializer-deserializer (SERDES) circuit of a first plurality of SERDES circuits for interconnection to a digital logic circuit for a first serial communication channel, wherein the first plurality of SERDES circuits comprises a first lower-speed SERDES circuit and a higher-speed SERDES circuit; and
programming a second multiplexer to select a second SERDES circuit of a second plurality of SERDES circuits for interconnection to a digital logic circuit for a second serial communication channel, wherein the second plurality of SERDES circuits comprises a second lower-speed SERDES circuit and the higher-speed SERDES circuit.

12. The method of claim 11, wherein the first and second multiplexers are programmed in a first operating mode to interconnect the first and second lower-speed SERDES circuits to the digital logic circuits for the first and second serial communication channels, and wherein the first and second multiplexers are programmed in a second operating mode to interconnect the higher-speed SERDES circuit to the digital logic circuits for the first and second serial communication channels.

13. The method of claim 11, wherein the digital logic circuits comprise dedicated physical coding sublayer circuits.

14. The method of claim 11, wherein the digital logic circuits are configured within a core fabric of a programmable logic device.

15. A method of configuring serial communication interfaces on an integrated circuit, the method comprising:
programming a first multiplexer to select a first clock data recovery circuit of a first plurality of clock data recovery circuits for interconnection to a first serial-deserializer circuit, wherein the first plurality of clock data recovery circuits comprises a first lower-speed clock data recovery circuit and a higher-speed clock data recovery circuit; and
programming a second multiplexer to select a second clock data recovery circuit of a second plurality of clock data recovery circuits for interconnection to a second serializer-deserializer circuit, wherein the second plurality of clock data recovery circuits comprises a second lower-speed clock data recovery circuit and the higher-speed clock data recovery circuit.

16. The method of claim 15, wherein the first and second multiplexers are programmed in a first operating mode to interconnect the first and second lower-speed clock data recovery circuits to the first and second serializer-deserializer circuits, and wherein the first and second multiplexers are programmed in a second operating mode to interconnect the higher-speed clock data recovery circuit to the first and second serializer-deserializer circuits.

17. A method of providing a serial interface on an integrated circuit, the method comprising:
receiving two sub-groups of parallel transmission data streams by two lower-speed physical coding sublayer channels;
encoding the two sub-groups of parallel transmission data streams by the two lower-speed physical coding sublayer channels to form two sub-groups of encoded data streams;
sending the two sub-groups of encoded data streams in parallel to a higher-speed serializer circuit; and
serializing the two sub-groups of encoded data by the higher-speed serializer circuit to form a higher-speed serial transmission data stream.

18. A method of providing a serial interface on an integrated circuit, the method comprising:
receiving two sub-groups of parallel transmission data streams by two lower-speed physical coding sublayer channels;
encoding the two sub-groups of parallel transmission data streams by the two lower-speed physical coding sublayer channels to form two sub-groups of encoded data streams;
serializing the two sub-groups of encoded data streams by two lower-speed serializer circuits to create two lower-speed serial transmission data streams; and
serializing the two lower-speed serial transmission data streams to form a higher-speed serial transmission data stream.

* * * * *